Oct. 13, 1964    J. DUMPIS    3,152,846
REPLACEMENT KIT FOR DEFECTIVE BEARINGS
Filed July 13, 1962    2 Sheets-Sheet 1

INVENTOR:
JANIS DUMPIS
BY
Sutherland Poster & Taylor
ATTORNEYS.

Oct. 13, 1964        J. DUMPIS        3,152,846
REPLACEMENT KIT FOR DEFECTIVE BEARINGS

INVENTOR:
JANIS DUMPIS

3,152,846
REPLACEMENT KIT FOR DEFECTIVE BEARINGS
Janis Dumpis, St. Ann, Mo., assignor to Champ-Items,
Inc., St. Louis, Mo., a corporation of Missouri
Filed July 13, 1962, Ser. No. 209,650
5 Claims. (Cl. 308—37)

This invention relates to a replacement bearing kit and more particularly to a kit containing a plurality of parts which can readily replace a defective bearing of the rubber sleeve type frequently used between moving parts in an automotive chassis, or the like. For purposes of illustration here, the invention is described as a kit for replacing a rubber sleeve type bearing, such as frequently used in the steering linkage of an automobile, specifically the bearing mounting the so-called idler arm in such a linkage. It should be understood, however, that a kit, according to this invention, can be used as a replacement bearing in other applications by merely change in size, or with minor changes in shape in some, or all, of the separate parts. In other words, this kit is adaptable not only to replace the bearing for an idler arm in a steering linkage, but to many automotive applications of which this one example can be considered as illustrative.

In recent years, rubber bearings have become favored by the automotive industry, since rubber, or rubber-like materials are well known for sound insulating and shock absorbing qualities. These qualities are especially desirable for chassis bearings in automotive applications to isolate shock and road noise from reaching the body compartments through the chassis. In the example above-mentioned, road noise and vibration are isolated in the steering linkage by a bearing of rubber-like material at a point of connection between the chassis of the vehicle and the linkage. In some instances, the chassis mounting for the idler arm is a pair of spaced metal ears with aligned apertures, or bolt holes. The idler arm has an apertured boss located between the ears on the chassis. The bearing has a metal sleeve with serrated ends clamped between the ears by a bolt passing through the sleeve and the bolt holes in the ears which holds the sleeve stationary with respect to the ears. Bonded or otherwise secured around the outside of the metal sleeve is a bushing of rubber-like material. Originally this bushing is cylindrical and considerably larger in diameter than the elongated aperture in the boss of the idler arm. When the bushing is pressed into the idler arm boss, it is placed under considerable compression so that the bushing cannot rotate in the boss and the excess thickness of rubber-like material is squeezed out at opposite ends of the boss. During oscillation of the arm, the rotation between arm and stationary sleeve is absorbed by distortion of the rubber-like material in shear, and, of course, the bushing has a tendency to return like a spring to an angular position with respect to the metal sleeve in which strain is at a minimum.

Bearings of this kind do not last forever. They are subject to failure and especially this is so when the rubber-like bushing loses some of its elasticity and loosens enough to rotate in the boss. This causes rapid deterioration and dangerous play in the steering. Replacement then becomes necessary. A special type of press is required for replacement of a rubber bushing. This type of press is seldom a part of the equipment of the smaller repair shops. This class of shop usually relies upon replacement parts and kits which make repair, or replacement, simple and inexpensive without requiring an investment in special tools for each job. Special tools can be a substantial expense. As is usually the case, every model of a particular make can, and often does, require special tools for a variety of different purposes. Because of this and other obvious reasons, it is much more profitable for the smaller repair shops to invest in special kits rather than special tools.

It is one of the objects of this invention to provide a replacement kit for a bearing which requires no special tools for installation.

It is another object of this invention to provide a bearing kit for replacement purposes which, when installed, operates as well as the original bearing.

It is still another object of this invention to provide a bearing kit for replacement purposes which, when installed, according to very simple instructions, will be dependable and safe as a vital part of a steering or suspension system for automotive use.

According to this invention, the replacement kit has several basic parts which will fulfill the objects of this invention. Other parts may be added to this kit, however, if required to obtain a bearing with longer life or better performance characteristics. In the basic kit, there is a spacer nut, a pair of bolts and a pair of round bearing sleeves with apertures which telescope over and fit the hexagonal outside of the spacer nut so as to be held stationary on the nut. The spacer nut is held stationary between spaced ears on the chassis by the bolts passing through the apertures in the ears. The pair of bearing sleeves slide over the outside of the nut and each has an outer cylindrical surface forming spaced bearings within the boss of the control arm, which bearing surfaces replace the rubber sleeve of the original torsion type bearing. The bearing sleeves used are non-metallic. Materials, such as bonded fibre, or rubber-like materials having good mechanical characteristics for a bearing surface, are preferred. There are many of these which are commonly referred to as plastics which meet the mechanical specifications for a good bearing. Most of these materials are effective to isolate sound and vibrations.

The above-described kit parts require no special tools for installation. The original rubber sleeve bearing when worn is readily removable from the boss of the steering arm. This element is then replaced by assembling the bearing sleeves and spacer nut in the boss of the arm. The assembled bearing is secured in place between the spaced ears on the chassis by inserting and tightening a pair of bolts into opposite ends of the spacer nut. A difficult job requiring special tools is thereby avoided.

Other objects and advantages of the invention will appear from the following detailed description which is in such clear, concise and exact terms as will enable any one skilled in the art to make and use the same when taken in conjunction with the accompanying drawings, forming a part thereof, and in which.

Figure 1:
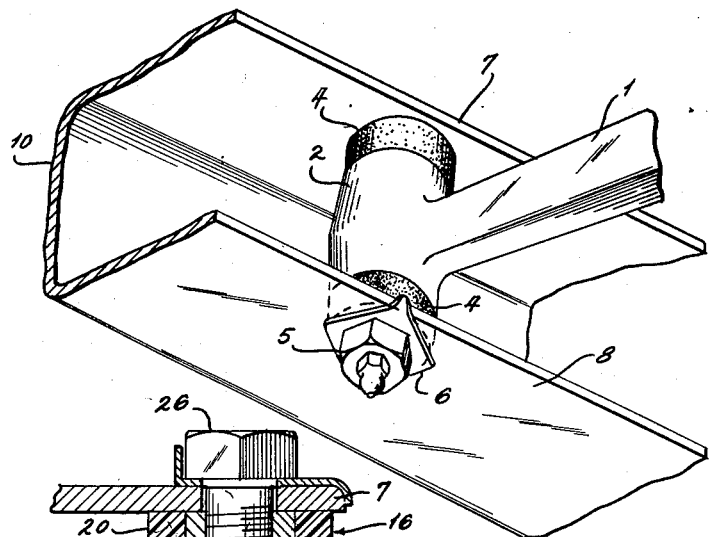
FIG. 1 is an environmental view of an idler arm and its mounting on an automotive chassis element.

Turning now to the drawings, FIG. 1 shows a portion of an idler arm 1 forming part of a steering linkage (not shown) for automotive use. Integral with the arm 1 is a cylindrical boss 2 which is hollow from end to end. The boss 2 is hingedly mounted on a rubber sleeve like bearing, a portion of which is shown at 4. This particular bearing is one of a type usually used in automotive practice and briefly described heretofore. Bearing 4 and boss 2 are secured in place by suitable bolts, such as 5, which thread into a metal sleeve within the rubber bearing 4. Keepers 6 prevent the loosening of bolts 5. From FIG. 1, it will be apparent that the idler arm is rotatable upon a bearing which is secured between two ears, such as 7 and 8, in an automotive chassis member 10. It will also be understood that the end of the arm 1, not shown, connects with suitable link members, such as those used in the conventional steering linkage of an automobile.

As above stated, bearings, such as 4, sometimes fail after prolonged use and must be replaced. Replacement requires removal of the bolts 5 from the sleeve internal of the bearing 4 and removal of the linkage including the idler arm 1. If a similar bearing 4 is to replace that which is worn out, is is necessary to first remove bearing 4 and then place the idler arm 1 in a special press which is adapted to force in a replacement rubber-like bushing 4. Since such special presses are expensive and are not likely to be found as part of the tools and equipment of small repair shops, this invention provides a kit with suitable parts which can replace the bearing 4 within the boss 2 without the aid of a special press or other special tools.

Figure 2:
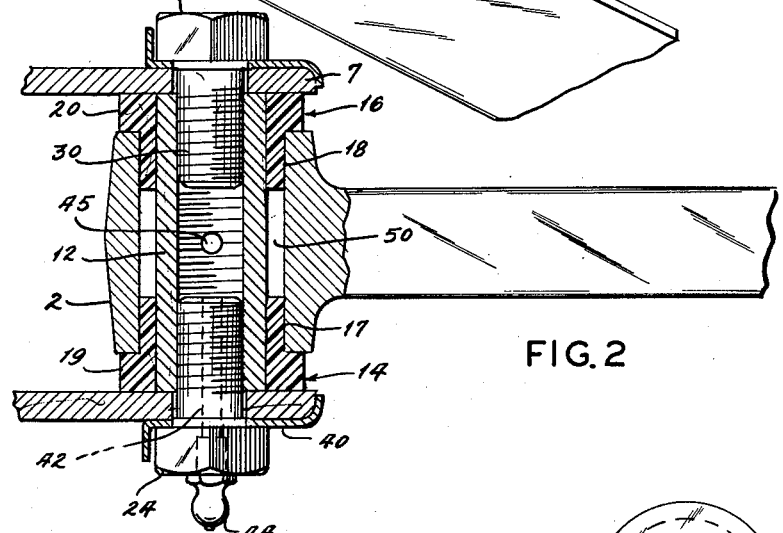
FIG. 2 is a vertical transverse sectional view through an idler arm showing the parts of the kit installed.

The kit, according to this invention, is shown installed in FIG. 2. Like parts in FIG. 2 will be given the same reference characters so as to facilitate an understanding of the use of the kit and the construction of its several parts. It will be understood that the first step in installation of the kit is to remove the original rubber bearing 4. Since the reason for its replacement is because it is worn and loose, its removal from the boss 2 of the idler arm 1 usually presents no problem. After the rubber bearing 4 is removed, spacer nut 12 is placed within the hollow boss 2. This spacer nut 12 is threaded internally from end to end, but has an outer periphery which is preferably hexagonal. There are two flanged bushings provided in the kit and illustrated in FIG. 2 as 14 and 16. The exterior surfaces of these bushings are cylindrical and stepped so as to form a bearing portion 17 on the bushing 14 and a bearing portion 18 on the bushing 16. These bearing portions 17 and 18 are on adjacent ends of the bushings when mounted in assembled relation. The remote ends of the bushings, such as 19 on bushing 14 and 20 on bushing 16, form enlarged flanges. Each of the bushings is provided with a central aperture which is hexagonal and dimensioned to fit slidably on the hexagonal outer surface of the spacer nut 12.

Figure 4:
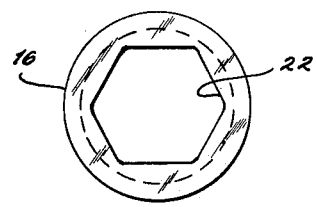
FIG. 4 is a top plan view of one of the plastic bearing sleeves supplied with the kit.
Figure 5:
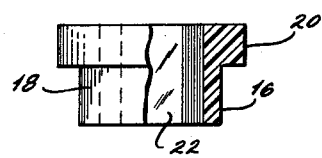
FIG. 5 is a side view of the bearing sleeve in FIG. 4.
Figure 3:
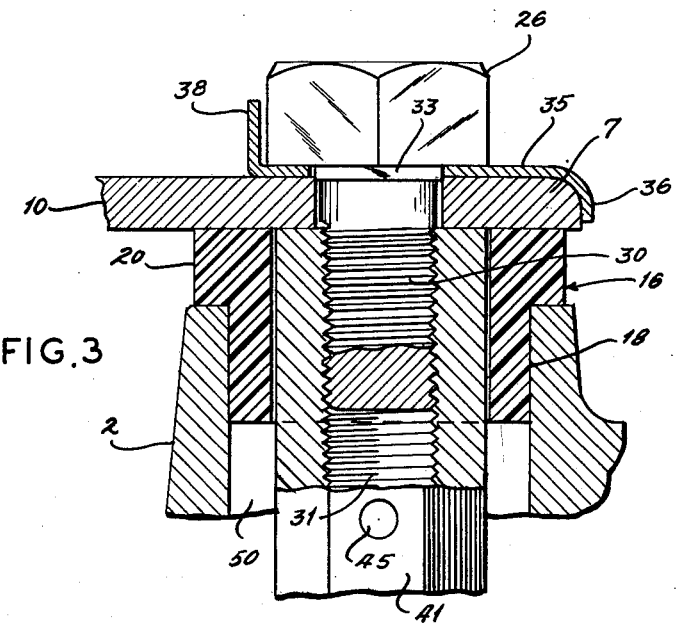
FIG. 3 is a fragmentary view partly in section of a part of the installed kit shown in FIG. 2 on an enlarged scale.

Turning to FIGS. 4 and 5, which illustrate one of the bushings in detail, it will be apparent that the hexagonal aperture 22 in the bushing 16, for example, extends from end to end thereof. Returning now to FIG. 2, the bushings 14 and 16, respectively, slide onto the outer hexagonal periphery of the spacer nut 12 so that their cylindrical bearing surfaces 17 and 18, respectively, form a journal for rotation of the arm 1 and boss 2 about the spacer nut 12. The idler arm with the kit parts assembled, as described, is then inserted between the ears 7 and 8 of the chassis 10. Bolt 26 is then threaded into the spacer nut 12 from one end through the aperture in the ear 7, and bolt 24 is threaded into the spacer nut 12 at its opposite end through the aperture in the ear 8. The bolts are made up snug enough to draw the ears 7 and 8 toward one another and clamp the spacer nut 12 at its opposite ends so that it cannot rotate with respect to the ears 7 and 8. In order to prevent any loosening, each of the bolts has a lock plate. Since both lock plates and bolts are the same, only one will be described. Turning now to FIG. 3, the bolt 26 is threaded at 30 to mesh with the threads 31 within the spacer nut 12. Adjacent the head of the bolt 26 is a square shank 33 which is in turn received within a square aperture centrally of a lock plate 35. The lock plate 35 is originally flat and, of course, rotates with the bolt 26 as the bolt is made up tight. After tightening, the edges of the metal lock plate 35 are bent down, such as at 36, to engage the side of ear 7. The opposite edge of the lock plate 35 is bent upwardly, such as 38, to engage one of the flats on the head of the bolt 26. The lock plate 35, therefore, prevents loosening of the bolt 26. A similar lock plate 40 operating in the same manner prevents loosening of the bolt 24. Once both bolts 24 and 26 are tightened, then spacer nut 12 is clamped against rotation. Furthermore, the spacer nut 12 in the kit is so dimensioned as to prevent any distortion of the ears 7 and 8 by the clamping bolts 24 and 26. Although FIG. 3 is a fragmentary sectional view, enough of the spacer nut 12 is shown to illustrate its outer hexagonal surface 41 which, when locked in position, prevents turning of the bearing sleeve 16. It performs the same function for the bearing sleeve 14.

Returning now to FIG. 2, the bolt 24 is apertured longitudinally thereof to form a passage 42 which is threaded at its outer end to receive a grease fitting 44. In the wall of the spacer nut 12 is an aperture 45 located between the ends of the bearing sleeves 14 and 16. Outlet 45 in turn communicates with a chamber 50 formed between the inside surface of the boss 2, the outside hexagonal surface of the spacer nut 12 and the ends of the bearing sleeves 14 and 16. Chamber 50 can be supplied with grease from the fitting 44 at intervals so as to lubricate the bearing surfaces 17 and 18 within the boss 2.

Figure 6:
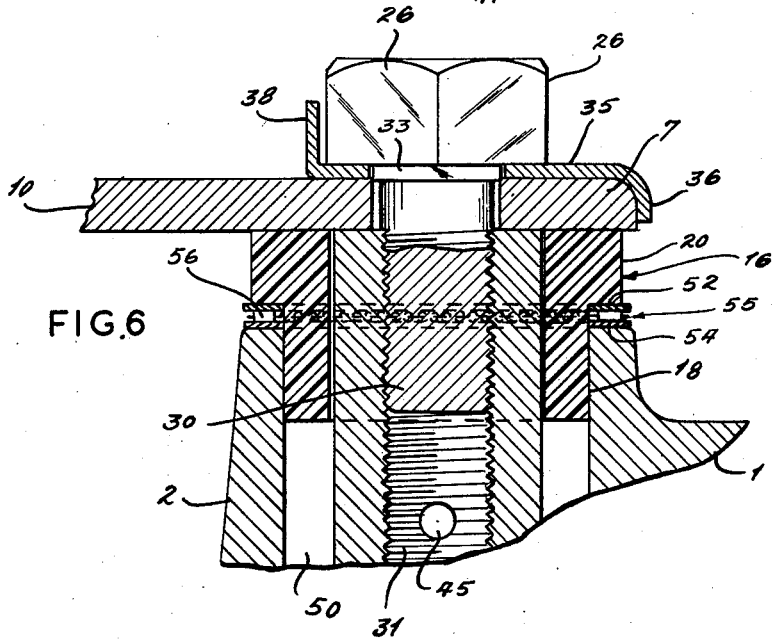
FIG. 6 is a fragmentary view partly in section illustrating a kit with parts modified to permit the use of thrust bearings.

In the modified form of kit shown in FIG. 6, the same reference characters are used to indicate like parts. In the modification, there is shown an installation of a kit which contains not only the parts heretofore described, but also thrust bearings. These may, or may not, be furnished with the kit, but, if found desirable, certain minor changes can be made to accommodate them in the installed kit. The kit contains the same parts, as heretofore described, except that the flange 20 of the bearing sleeve 16 is slightly narrower axially. Since both ends of the installed kit would be alike, this would also be true of the flange 19 of the bearing sleeve 14, but since both ends of the kit are the same, only one will be described. The thinner flange 20 of the bearing sleeve 16 is dimensioned so as to leave an annular space between the bottom surface 52 of the flange 20 and the end surface 54 of the boss 2. This narrow space is sufficient to accommodate a thrust collar 55 with needle roller bearings 56. The thrust collar 55 would receive its lubrication by way of the outlet 45, chamber 50 to the bearing surface 18 within the boss 2. Grease working past the surface 18, especially when high pressure is applied to the grease fitting 44, will in turn extrude through the thrust collar parts past the rollers 56 to lubricate the thrust collar 55.

Under ordinary conditions, thrust collars, such as 55, are unnecessary unless the bearing must support heavy thrust loads axially between the ears 7 and 8. For such an installation, thrust collars, such as 55, might be deemed desirable. Ordinarily the thrust load in such bearings is not great and the flanges 19 and 20 of the bearing sleeves are adequate.

Changes in and modifications of the construction described may be made without departing from the spirit of my invention or sacrificing its advantages.

Having thus described the invention, what is claimed and desired to be secured by Letters Patent is:

1. A replacement bearing kit adapted to swingably interconnect a hollow bearing boss on one member between spaced apertured ears on another member, said kit comprising, (1) a spacer nut threaded internally from its opposite ends to receive bolts and dimensioned to extend through said hollow bearing boss, (2) bolt means having threaded ends adapted to extend through said apertured ears and engage in opposite internal threaded ends of said spacer nut to clamp the ends of said spacer nut between said ears and against relative movement therebetween, (3) bearing sleeve means having an outer bearing surface for rotatable mounting within said hollow bearing boss and means for holding said sleeve means spaced apart within said boss and for positioning said boss axially of said spacer nut and
(4) interengaging means within said bearing sleeve means and on the outside surface of said spacer nut forming an axially slidable but non-rotatable mounting for said bearing sleeve means on said spacer nut.

2. A replacement bearing kit adapted to swingably interconnect a hollow bearing boss on one member between spaced apertured ears on another member, said kit comprising,
(1) a spacer nut with a flat longitudinally extending side and dimensioned lengthwise to extend through said hollow bearing boss,
(2) bolt means having threads and adapted to extend through said apertured ears and into said spacer nut to clamp opposite ends of said spacer nut against an adjacent ear to hold said spacer nut and ears against relative rotation,
(3) bearing sleeve means slidably fitting over the outside of said spacer nut and held against rotation by said flat side, and
(4) a bearing surface on the outside of said bearing sleeve means adapted to be received within said hollow bearing boss and form a rotatable connection between said members and flange means on said bearing sleeve means for locating said bearing surface in said hollow bearing boss and said bearing boss located with respect to said spacer nut.

3. The combination as defined in claim 2 in which said bearing sleeve means is formed of a readily moldable non-metallic material.

4. A replacement bearing kit adapted to swingably interconnect a hollow bearing boss on one member between spaced apertured ears on another member, said kit comprising,
(1) a spacer nut with flat sides extending from end to end, said nut being dimensioned lengthwise to extend through said hollow bearing boss,
(2) bolt means having threads and adapted to extend through said apertured ears and into said spacer nut to clamp opposite ends of said spacer nut against an adjacent ear to hold said spacer nut and said ears against relative rotation,
(3) a pair of flanged bearing sleeve means slidably fitting over the outside of said spacer nut and held against relative rotation by said flat sides,
(4) flanged ends on said bearing sleeve means adapted to be interposed between one of said ears and an end of said bearing boss, and
(5) a bearing surface on the outside of each of said bearing sleeve means spaced inwardly of said flanges and adapted to be received within said hollow bearing boss and form a rotatable connection between said members.

5. A replacement bearing kit adapted to swingably interconnect a hollow bearing boss on one member between spaced apertured ears on another member, said kit comprising,
(1) a spacer nut with flat sides extending from end to end thereof, said nut being dimensioned lengthwise to extend through said hollow bearing boss.
(2) a pair of bolts having threaded stems adapted to extend through each of said apertured ears respectively and into the threads internally of said spacer nut to clamp opposite ends of said spacer nut against an adjacent one of said ears to hold said spacer nut and ears against relative rotation,
(3) non-metallic bearing sleeve means slidably fitting over the outside of said spacer nut and held against relative rotation by engagement with said flat sides and contacting the spaced apertured ears when the sleeve means are mounted therebetween,
(4) a bearing surface on the outside of said bearing sleeve means adapted to be received within said hollow bearing boss and form a rotatable connection with said hollow bearing boss,
(5) and apertured lock plates on the stem of each of said bolts having a non-rotatable connection with each bolt and adapted to form a non-rotatable connection with each of said ears.

References Cited in the file of this patent
UNITED STATES PATENTS

| | | |
|---|---|---|
| 722,649 | Bartley | Mar. 10, 1903 |
| 1,398,049 | Swayze | Nov. 22, 1921 |
| 1,911,440 | Desoutter | May 30, 1937 |
| 2,324,997 | Brown | July 20, 1943 |
| 2,788,221 | Pritchard | Apr. 9, 1957 |
| 3,039,831 | Thomas | June 19, 1962 |
| 3,072,448 | Melton et al. | Jan. 8, 1963 |